(12) United States Patent
Anderson et al.

(10) Patent No.: US 8,216,445 B2
(45) Date of Patent: Jul. 10, 2012

(54) NANOPOROUS INSULATING OXIDE DEIONIZATION DEVICE HAVING ASYMMETRIC ELECTRODES AND METHOD OF USE THEREOF

(75) Inventors: Marc A. Anderson, Madison, WI (US); Kevin C. Leonard, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 1287 days.

(21) Appl. No.: 11/932,741

(22) Filed: Oct. 31, 2007

(65) Prior Publication Data

US 2008/0121531 A1 May 29, 2008

Related U.S. Application Data

(60) Provisional application No. 60/855,666, filed on Oct. 31, 2006.

(51) Int. Cl.
*H01G 9/042* (2006.01)
*H01G 9/045* (2006.01)
*H01G 9/048* (2006.01)
*C02F 1/469* (2006.01)
*C02F 1/58* (2006.01)

(52) U.S. Cl. ........ 205/701; 205/688; 205/703; 205/746; 205/754; 205/759; 205/760; 205/770; 361/503; 361/504; 361/505

(58) Field of Classification Search .................. None
See application file for complete search history.

(56) References Cited

U.S. PATENT DOCUMENTS

| | | | |
|---|---|---|---|
| 5,006,248 A | 4/1991 | Anderson et al. | |
| 5,208,190 A | 5/1993 | Anderson et al. | |
| 6,798,639 B2 * | 9/2004 | Faris et al. | 361/302 |
| 2002/0189947 A1 * | 12/2002 | Paul et al. | 204/461 |
| 2004/0074768 A1 * | 4/2004 | Anex et al. | 204/294 |
| 2005/0155216 A1 * | 7/2005 | Cho et al. | 29/623.5 |

OTHER PUBLICATIONS

Ryoo, M.-W. et al. "Improvement in capacitive deionization function of activated carbon cloth by titania modification," Water Research, 37, 2003, 1527-1534.*

(Continued)

*Primary Examiner* — Krishnan S Menon
*Assistant Examiner* — Michelle Adams
(74) *Attorney, Agent, or Firm* — Armstrong Teasdale LLP

(57) ABSTRACT

A nanoporous insulating oxide deionization device, method of manufacture and method of use thereof for deionizing a water supply (such as a hard water supply), for desalinating a salt water supply, and for treating a bacteria-containing water supply. The device contains two composite electrodes each constructed from a conductive backing electrode and a composite oxide layer being an insulating oxide or a non-insulating oxide and an intermediate porous layer. The composite layer being substantially free of mixed oxidation states and nanoporous and having a median pore diameter of 0.5-500 nanometers and average surface area of 300-600 m$^2$/g. The composite layer made from a stable sol-gel suspension containing particles of the insulating oxide, the median primary particle diameter being 1-50 nanometers. The difference in zeta potential, at a pH in the range of 6-9, being sufficient to suitably remove alkaline and alkaline earth cations (such as Ca$^{2+}$ and Na$^{1+}$), various organic and other inorganic cations and organic and inorganic anions from water, preferably household hard water. One composite layer being constructed from a mixture of Al$_2$O$_3$, MgAl$_2$O$_4$ and/or Mg-doped Al$_2$O$_3$ particles, and the other composite layer being constructed from SiO$_2$ or TiO$_2$.

37 Claims, 10 Drawing Sheets

OTHER PUBLICATIONS

Nelson, B. P. et al. "Control of Surface and Zeta Potentials on Nanoporous TiO2 Films by Potential-Determining and Specifically Adsorbed Ions," Langmuir 2000, 16, 6094-6101.*

Skluzacek, J. M. et al. "An iron-modified silica nanofiltration membrane: Effect of solution composition on salt rejection," Microporous and Mesoporous Materials 94 (2006) 288-294; Available online May 30, 2006.*

Chu, L., et al., Microporous Silica Gels From Alkylsilicate-Water Two Phase Hydrolysis, Mat. Res. Soc. Symp. Proc. 346:855-860 (1994).

Conway, B.E., "Electrochemical Supercapacitors; Scientific Fundamentals and Technological App.," Kluwer Academic/Plenum Publishers, NY p. 221-227 (1999).

Jang, J.H., et al., "Supercapacitor Performance of Hydrous Ruthenium Oxide Electrodes Prepared . . . ," J. Electrochemical Soc. 153:A321-A328 (2006).

Kotz, R., et al., "Principles and applications of electrochemical capacitors,"Electrochimica Acta 45:2483-2498 (2000).

Liu, K-C., et al., "Porous Nickel Oxide/Nickel Films for Electrochemical Capacitors," J. Electrochem. Soc. 143:124-130 (1996).

Pang, S-C., et al., "Novel Electrode Materials for Thin-Film Ultracapacitors: Comparison of Electrochemical Properties of Sol-Gel . . . ," J. Electrochem. Soc. 147:444-450 (2000).

* cited by examiner

NANOPOROUS INSULATING OXIDE DEIONIZATION DEVICE HAVING ASYMMETRIC ELECTRODES AND METHOD OF USE THEREOF

CROSS REFERENCE TO RELATED APPLICATIONS

This application claims priority to and benefit of U.S. Provisional Application Ser. No. 60/855,666, filed on Oct. 31, 2006, which is hereby incorporated herein by reference in its entirety.

STATEMENT REGARDING FEDERAL FUNDING

The invention was made with the United States government support awarded by the following agencies: NSF 0441575. The United States government has certain rights in the invention.

FIELD OF THE INVENTION

The invention disclosed herein relates to the field of water softeners, water treatment, and deionization devices, particularly such devices containing asymmetric electrodes having a nanoporous composite layer thereon and electrolyte membrane, and methods of manufacture and use thereof.

BACKGROUND OF THE INVENTION

Capacitive deionization devices and systems have historically employed high surface area carbon materials such as carbon aerogels (see Farmer J et al., *J Electrochem Soc* 143:159 (1996) and Gabelich C et al., *Environ Sci Technol* 36:3010 (2002)) or other porous carbon electrodes. (See Johnson A M et al., *J Electrochem Soc* 118:510 (1971)). Such systems are effective at treating already-softened water (i.e., where only $Na^+$ and other single valent cations are present). However, such systems generally fail to effectively remove $Ca^{2+}$ and other multivalent cations from hard water.

Many metal oxides have traditionally been used in the manufacture of electrochemical electrodes including but not limited to, $RuO_2$, $MnO_2$, $V_2O_5$ and $NiO$. (Jang J et al., *J Electrochem Soc* 153:A321 (2006); Pang S et al., *Electrochem Soc* 147:444 (2000); and Liu et al., *J Electrochem Soc* 143:124 (1996)). Also, many of these metal oxide electrochemical electrodes undergo faradaic reactions as part of their capacitive behavior (i.e., psuedocapacitors). Such metal oxides also undergo redox reactions yielding mixed oxidation states, which may be undesirable in given systems of use. Metal oxides may be more costly t insulating oxides.

However, there exists a long felt need for unproved electrodes, water softeners, water treatment, desalination, and deionization equipment to effectively remove single and particularly multivalent cations (and anions) from hard water.

SUMMARY OF THE INVENTION

One aspect of the invention is a water treatment device comprising a first composite electrode comprising a first conductive member, and, a first composite member comprising a first oxide selected from the group consisting of an insulating oxide and a non-insulating oxide, the first composite member having a median pore diameter in the range of 0.1-500 nanometers, a second composite electrode comprising a second conductive member, and, a second composite member comprising a second oxide selected from the group consisting of an insulating oxide and a non-insulating oxide, the second composite member having a median pore diameter in the range of 0.1-500 nanometers; a porous member disposed between the first and second composite electrodes; and, an electrical potential member, wherein the first and second composite oxides are different, and, wherein if the first or second oxide has a zeta potential less than zero at the pH of the water, the other oxide has a zeta potential greater than zero at the pH of the water. The porous member separator allows the electrolytes in the electrolyte-containing solution to migrate, and it prevents shorting of the electrodes. Also, the composite members of the instant invention may also be referred to as being "microporous," particularly at the larger end of the median pore diameter range (i.e., closer to 500 nanometers).

In an exemplary embodiment of the water treatment device, the first composite member is substantially free of mixed oxidation states of the first oxide, and, the second composite member is substantially free of mixed oxidation states of the second oxide. By "substantially free of mixed oxidation states" it is meant that the amount present has no material adverse effect on the electric insulating property of the composite electrode.

In another exemplary embodiment of the water treatment device, the median pore diameter is in the range of 0.3-25 nanometers.

In another exemplary embodiment of the water treatment device, the median pore diameter is in the range of 0.3-10 nanometers.

In another exemplary embodiment of the water treatment device, the non-insulating oxide is $MnO_2$, $V_2O_5$, iron oxides, $RuO_2$, $NiO$, $CoO$ or a transition metal oxide.

In another exemplary embodiment of the water treatment device, the first and second composite members are layers each having an average thickness in the range of 0.01 to 50 µm, and the second oxide is an alkaline substituted aluminum oxide or an alkaline earth substituted aluminum oxide.

In another exemplary embodiment of the water treatment device, the first and second composite members are layers each having an average thickness in the range of 0.1 to 10 µm, and the second oxide is an alkaline substituted aluminum oxide or an alkaline earth substituted aluminum oxide.

In another exemplary embodiment of the water treatment device, the first and second composite members are constructed from first and second stable sol-gel suspensions comprising first and second insulating oxide particles, respectively, each having a median primary particle diameter in the range of 1-50 nanometers, and the difference between the first negative zeta potential and second positive zeta potential, at a pH in the range of 6-9, is sufficient to suitably remove alkaline cations, alkaline earth cations, organic cations, and/or organic anions from water.

Sufficient removal potential is that high enough such that the force exerted by the removal potential on the ions exceeds the force of attraction to the removal composite member exerted on the ion, and whereby the removal efficiency increases with increasing external potential. Sufficient regeneration potential is a potential that is high enough such that the force moving the ions away from the removal electrode exceeds the interaction force between the ion and the removal composite member, whereby the regeneration potential is less than the repulsion force of the ion and the composite member of the same charge on the other electrode, and whereby the force is defined by the potential, either applied or the zeta potential of the material multiplied by the ion's charge.

In another exemplary embodiment of the water treatment device, the first insulating oxide particles are $SiO_2$, $TiO_2$ and us thereof and the second insulating oxide particles are an $Al_2O_3$, $MgAl_2O_4$, Mg-doped $Al_2O_3$, Ca-doped $Al_2O_3$, Na-doped $Al_2O_3$, K-doped $Al_2O_3$, Li-doped $Al_2O_3$, Be-doped $Al_2O_3$, Mg-substituted $Al_2O_3$, Ca-substituted $Al_2O_3$, Na-substituted $Al_2O_3$, K-substituted $Al_2O_3$, Li-substituted $Al_2O_3$, Be-substituted $Al_2O_3$, Mg-adsorbed $Al_2O_3$, Ca-adsorbed $Al_2O_3$, Na-adsorbed $Al_2O_3$, K-adsorbed $Al_2O_3$, Li-adsorbed $Al_2O_3$, Be-adsorbed $Al_2O_3$, or mixtures thereof.

In another exemplary embodiment of the water treatment device, the $SiO_2$ particles have a median primary particle diameter in the range of 1-50 nanometers.

In another exemplary embodiment of the water treatment device, the $TiO_2$ particles have a median primary particle diameter in the range of 1-50 nanometers.

In another exemplary embodiment of the water treatment device, the $SiO_2$ particles have a median primary particle diameter in the range of 1-8 nanometers.

In another exemplary embodiment of the water treatment device, the $TiO_2$ particles have a median primary particle diameter in the range of 0.3-5 nanometers.

In another exemplary embodiment of the water treatment device, the $Al_2O_3$ particles have a median primary particle diameter in the range of 1-50 nanometers.

In another exemplary embodiment of the water treatment device, the $Al_2O_3$ particles have a median primary particle diameter in the range of 1-20 nanometers.

In another exemplary embodiment of the water treatment device, the $MgAl_2O_4$ particles have a median primary particle diameter in the range of 1-50 nanometers.

In another exemplary embodiment of the water treatment device, the $MgAl_2O_4$ particles have a median primary particle diameter in the range of 1-20 nanometers.

In another exemplary embodiment of the water treatment device, the first insulating oxide particles are $SiO_2$, wherein the second insulating oxide particles are a mixture of $Al_2O_3$ and $MgAl_2O_4$ at a molar ratio in the range of (0.01-1):1, $Al_2O_3$:$MgAl_2O_4$, wherein the $SiO_2$ particles have a median primary particle diameter in the range of 1-50 nanometers, wherein the $Al_2O_3$ particles have a median primary particle diameter in the range of 1-50 nanometers, and, wherein the $MgAl_2O_4$ particles have a median primary particle diameter in the range of 1-50 nanometers.

In another exemplary embodiment of the water treatment device, the molar ratio of $Al_2O_3$:$MgAl_2O_4$ is in the range of (0.11):1, the $SiO_2$ particles have a median primary particle diameter in the range of 1-8 nanometers, the $Al_2O_3$ particles have a median primary particle diameter in the range of 1-20 nanometers, and, the $MgAl_2O_4$ particles have a median primary particle diameter in the range of 1-20 nanometers.

In another exemplary embodiment of the water treatment device, the first and second composite members each have an average surface area in the range of 300-600 m$^2$/g, the first composite member has a first isoelectric pH greater than or equal to 7, and, the second composite member has a second isoelectric pH less than or equal 7. The isoelectric pH is that pH where the zeta potential is 0.

In another exemplary embodiment of the water treatment device, the first and/or second conductive member is porous.

In another exemplary embodiment of the water treatment device, the first and/or second conductive member is nonporous.

In another exemplary embodiment of the water treatment device, the device further comprises a reference electrode constructed from a metal being Ag, Hg, Cu, Pd, Au, Pt or combinations thereof.

In another exempla embodiment of the water treatment device, the first and/or second conductive member is constructed from a metal being conductive polymer, metal, conductive carbon, or combinations thereof.

In another exemplary embodiment of the water treatment device, the first and/or second composite member is at least 95% free of mixed oxidation states of the oxide.

In another exemplary embodiment of the water treatment device, the first and/or second composite member each contains no more than a trace amount of mixed oxidation states of the oxide.

Another aspect of the invention is a method of using any one of the instant water treatment devices set forth herein to treat a water supply comprising the steps or acts of providing the device and the water supply, the water including one or more cations and one or more anions, generating sufficient electrical removing potential and sufficient electrical removing current between the first and second composite electrodes, and, passing the water supply between the first and second composite electrodes.

In an exemplary embodiment of the method of using any one of the instant water treatment devices set forth herein to treat a water supply, the water supply-contra positively-charged members selected from the group consisting of positively-charged bacteria, positively-charged protein virus, $Na^+$, $Ca^{2+}$, $Mg^{2+}$, $K^+$, $Sr^{2+}$, $Ba^{2+}$, $Fe^{2+}$, $Fe^{3+}$, $Mn^{2+}$, $Mn^{3+}$, $Me^{4+}$, $Mn^{7+}$, $Cu^+$, $Cu^{2+}$, $Cu^{3+}$, $PB^{2+}$, $Pb^{4+}$, $PbCl^+$, $Al^{3+}$, $Be^{2+}$, $Cs^+$, $Cr^{2+}$, $Cr^{3+}$, $Cr^{6+}$, $Co^{2+}$, $Co^{3+}$, $Ga^{3+}$, and $Zn^{2+}$, $Li^+$, $Hg^{2+}$, $Ni^{2+}$, $Ni^{3+}$, $Ag^+$, $Sr^{2+}$, $Sn^{2+}$, $Sn^{4+}$, $NH_2^+$, $H_3O^+$, $NO_2^+$, $Hg_2^{2+}$ or combinations thereof.

In another exemplary embodiment of the method of using any one of the instant water treatment devices set forth herein to treat a water supply, the water supply contains negatively-charged members selected from the group consisting of negatively-charged bacteria, negatively-charged amino acid virus, $Cl^-$, $NO_3^-$, $NO_2^-$, $SO_4^{2-}$, $HSO_3^-$, $S_2O_3^{2-}$, $HSO_4^-$, $HCO_2^-$, $HCO_3^-$, $CO_3^{2-}$, $F^-$, $As^{3-}$, $AsO_3^{3-}$, $AsO_4^{3-}$, $PO_3^{3-}$, $PO_4^{3-}$, $HPO_4^{2-}$, $H_2PO_4^-$, $H_2BO_3^-$, $HBO_3^{2-}$, $BO_3^{3-}$, $B_4O_7^{2-}$, $HB_4O_7^{2-}$, $ClO_3^-$, $ClO_4^-$; $ClO_2^-$, $ClO^-$, $Pb(OH)_4^{2-}$, $Pb(OH)_6^{2-}$, $PbCl_3^-$, $PbCl_4^{2-}$, $N_3^-$, $Br^-$, $H^-$, $I^-$, $N^{3-}$, $NH_2^-$, $O^{2-}$, $P^{3-}$, $S^{2-}$, $HS^-$, $O_2^{2-}$, $BrO_3^-$, $BrO^-$, $OH^-$, $CrO_4^{2-}$, $Cr_2O_7^{2-}$, $IO_3^-$, $MnO_4^-$, $C_2H_3O_2^-$, $C_2O_4^-$, $HC_2O_4^-$, $Te^{2-}$, $OCN^-$, $SCN^-$, $CN^-$ or combinations thereof.

In another exemplary embodiment of the method of using any one of the instant water treatment devices set forth herein to treat a water supply, the positively-charged and negatively-charged bacteria is selected from the group consisting of *Bacillus, Listeria, Staphytococcus, Streptococcus, Enterococcus, Clostridium, Mycoplasma*, actinobacteria, Firmicutes, and Deinococcus-Thermus, *Escherichia coli, Salmonella*, Enterobaderiaceae, *Pseudomonas, Moraxella, Helicobacter, Stenotrophomonas, Bdellovibrio*, acetic acid bacteria, *Legionella*, alpha-proteobacteria, *Wolbachia*, cyanobacteria, spirochaetes, green sulfur bacteria, green nonsulfur bacteria, Crenarchaeota, *Neiseria gonorrhoeae, Neisseria meningitidis, Moraxella catarrhalis, Hemophilus influenzae, Klebsiella pneumoniae, Legionella pneumophila, Pseudomonas aeruginosa, Escherichia coli, Proteus mirabilis, Enterobacter cloacae, Serratia marcescens, Helicobacter pylori, Salmonella enteritidis, Salmonella typhi*, or *Acinetobacter baumanii*.

In another exemplary embodiment of the method of using any one of the instant water treatment devices set forth herein to treat a water supply, the sufficient electrical removing potential is constant and in the range of −10 to 10 V/cm$^3$.

In another exemplary embodiment of the method of using any one of the instant water treatment devices set forth herein to treat a water supply, the sufficient electrical removing potential is constant and in the range of −2 to 2 V/cm$^3$.

In another exemplary embodiment of the method of using any one of the instant water treatment devices set forth herein to treat a water supply, the sufficient electrical removing current is constant and in the range of −5 to 5 A/cm$^3$.

In another exemplary embodiment of the method of using any one of the instant water treatment devices set forth herein to treat a water supply, the sufficient electrical removing current is constant and in the range of −1 to 1 A/cm$^3$.

In another exemplary embodiment of the method of using any one of the instant water treatment devices set forth herein to treat a water supply, the sufficient electrical removing current is constant and in the range of −100 to 100 mA/cm$^3$.

Another aspect of the invention is a method of regenerating any one of the instant water treatment devices set forth herein comprising the steps or acts of reversing the polarity of the electrical potential, and, providing sufficient electrical regeneration potential between the first and second composite electrodes.

Another aspect of the invention is a method of making any one of the instant composite electrodes set forth herein comprising the steps or acts of providing a wettable conductive member, providing a stable sol-gel suspension comprising oxide particles selected from the group consisting of insulating oxides and non-insulating oxides having a median primary particle diameter in the range of 0.5 to 500 nanometers, contacting the stable sol-gel suspension to the conductive member producing a sol-gel member, and, curing the sol-gel and conductive members producing the composite member.

In an exemplary embodiment of the method of making any one of the instant composite electrodes set forth herein, the method her comprises the acts or steps of heating the conductive member at a predetermined temperature and for a predetermined duration producing the wettable conductive member, contacting the stable sol-gel suspension to the wettable conductive member producing a sol-gel member, and, sintering the sol-gel and wettable conductive members at a predetermined sintering temperature and for a predetermined sintering duration producing the composite member.

In another exemplary embodiment of the method of making any one of the inset composite electrodes set forth herein the method comprises a plurality of contacting steps.

In another exemplary embodiment of the method of making any one of the instant composite electrodes set forth herein, the method comprises a plurality of sintering steps.

In another exempla embodiment of the method of making any one of the instant composite electrodes set forth herein, the insulating oxide is $SiO_2$, the predetermined sintering temperature is in the range of 300° C. to 400° C., and the predetermined sintering duration is 3 hours.

In another exemplary embodiment of the method of making any one of the instant composite electrodes set forth herein, the insulating oxide is a mixture of $MgAl_2O_4$ and $Al_2O_3$, the predetermined sintering temperature is 400° C., and the predetermined sintering duration is 6 hours.

In another exemplary embodiment of the method of making any one of the instant composite electrodes set forth herein, the stable sol-gel suspension is contacted with the wettable conductive member by a process selected from the group consisting of spray coating, spin coating, dip coating, slip casting, imbibing, electrodeposition, chemical vapor deposition and sputtering.

Another aspect of the invention is a method of desalinating water comprising the steps or acts of providing any one of the instant water treatment devices set forth herein, providing the salt water supply, generating sufficient electrical removing potential and sufficient electrical removing current between the first and second composite electrodes, and, passing the salt water supply between the first and second composite electrodes.

Another aspect of the invention is a method of treating a bacteria-containing and/or virus-containing water supply comprising the acts or steps of providing any one of the instant water treatment devices set forth herein, providing the bacteria-containing and/or virus-containing water supply, generating sufficient electrical removing potential and sufficient electrical removing current between the first and second composite electrodes, and, passing the bacteria-containing and/or virus-containing water supply between the first and second composite electrodes.

DETAILED DESCRIPTION OF THE EXEMPLARY EMBODIMENTS

Figure 1:
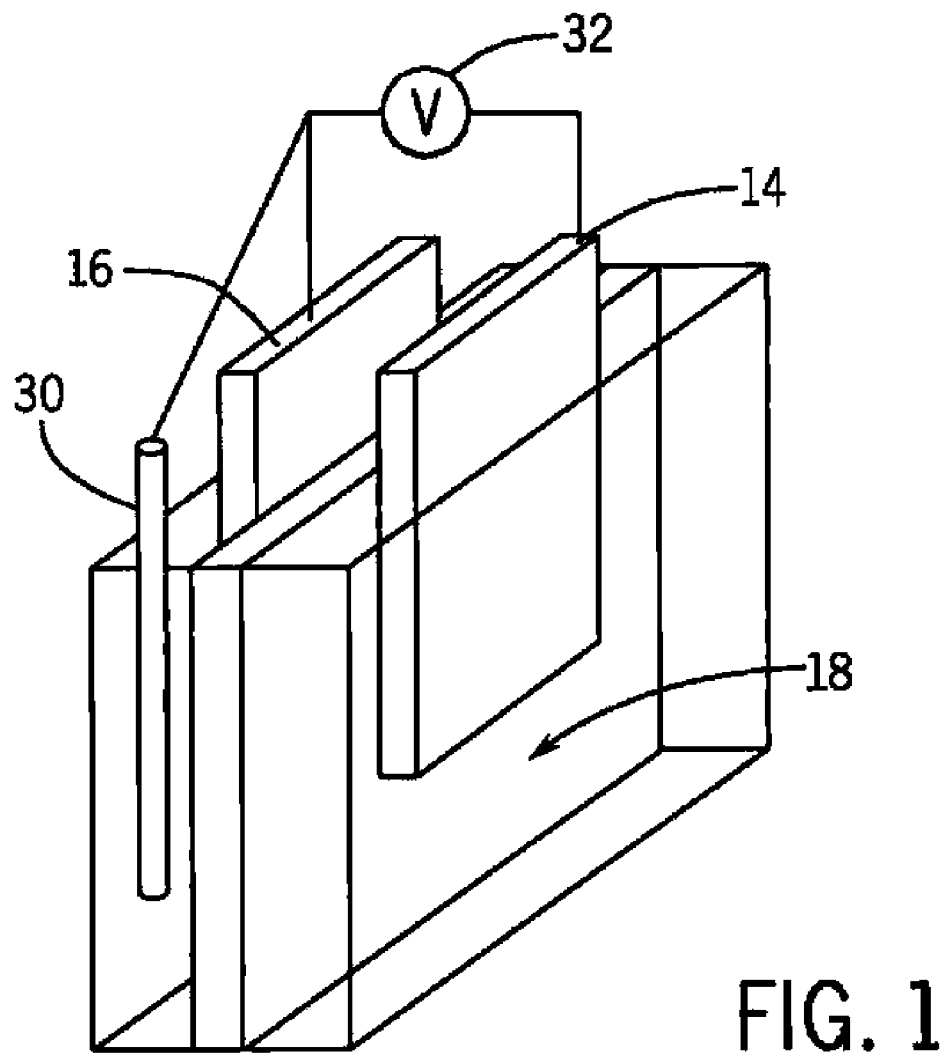
FIG. 1 shows the configuration of the deionization device of the present invention.
Figure 2:
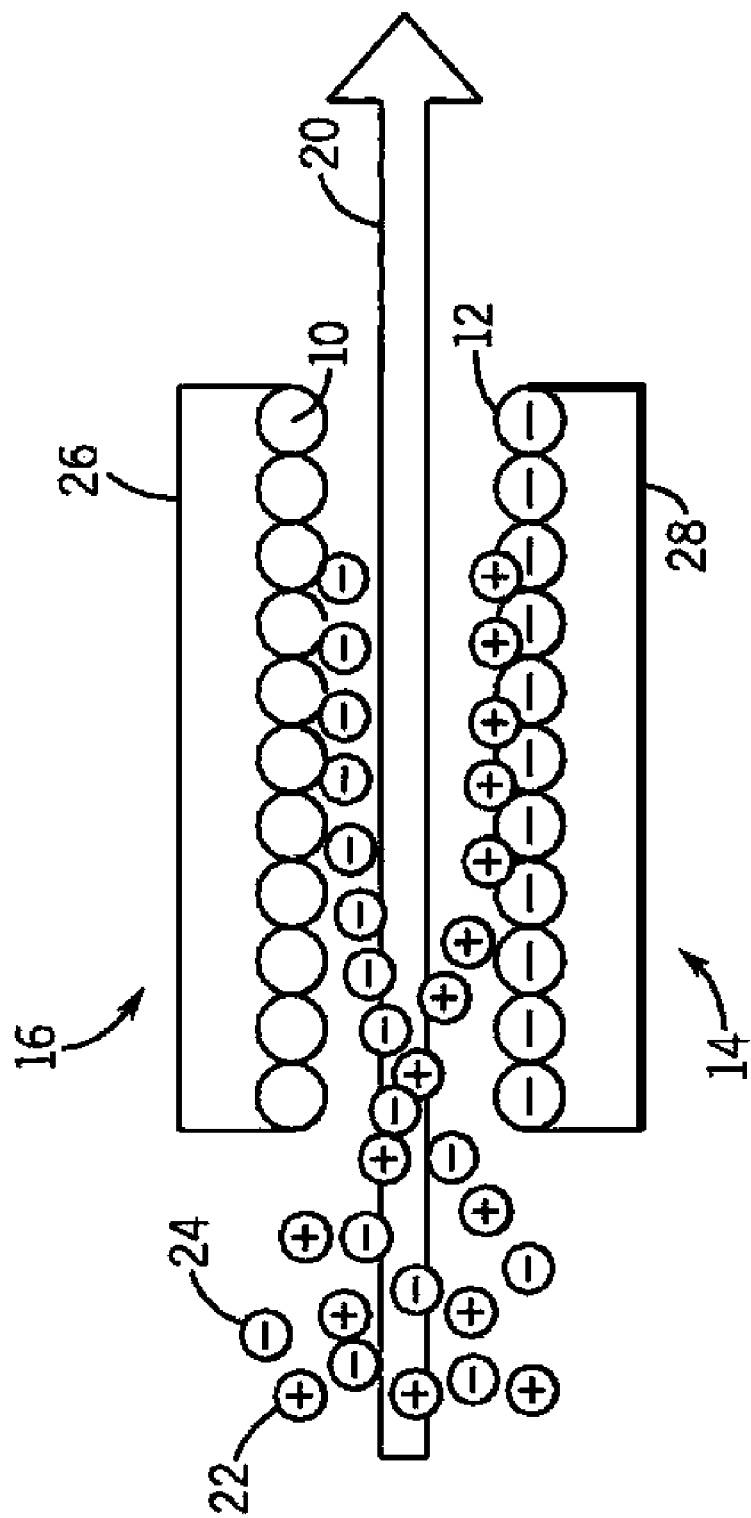
FIG. 2 shows operation of the deionization device on hard water containing cations and anions.

Shown in FIGS. 1 and 2 is the asymmetric deionization device of the present invention. The instant device is also referred to as a Porous Oxide Electrolyte Membrane (or, POEM) deionization device. The term "membrane" is used because the nano or microporous oxide films form a membrane on the surface of the fibers or particles of the porous carbon electrode. A nanoporous insulating oxide layer 10,12 on the composite negative electrode 14 and composite positive electrode 16 provide favorable electrical characteristics with respect to generating improved drinking water. The composite positive electrode 16 is constructed from a carbon backing electrode 26 coated with the oxide layer 10, which is a sol coating having a positive zeta potential such as $MgAl_2O_4$. The composite negative electrode 14 is constructed from a carbon backing electrode 28 coated with the oxide layer 12, which is a sol coating having a negative zeta potential such as $SiO_2$. The preferred resistivity of the carbon backing electrode 26,28 is around 0.04 Ohm-cm.

A porous polymer separator 18 provides separation between the composite negative electrode 14 and composite positive electrode 16 for the passing of hard water 20 containing anions 24 and cations 22. An electrical potential member 32 imparts an electrical potential across the composite negative electrode 14 and composite positive electrode 16.

As shown in FIG. 1, a reference electrode 30 is employed and is preferably constructed from silver (Ag) wire. One significant advantage to using metallic silver is that (much like SCE) it provides a reference voltage that allows the user to apply a known voltage across the negative electrode and positive electrode electrodes with respect to the reference electrode. In addition, the silver wire material reacts with the chloride ions naturally in solution to form silver chloride. That reaction produces a known voltage that establishes the reference voltage. Use of the silver wire also advantageously provides a low cost alternative to a SCE reference electrode. The silver wire material is also more durable and smaller in size than a SCE reference electrode.

As shown in FIG. 2, during operation, a potential is created across the two electrodes 14,16 causing cations 22 to be held against the negative electrode 14 and causing anions 24 to be held against the positive electrode 16. As a result, deionized water exits between the asymmetric composite electrodes 14,16, whereby the top electrode 16 has a positive zeta potential, and whereby the bottom electrode 14 has a negative zeta potential.

Figure 3:
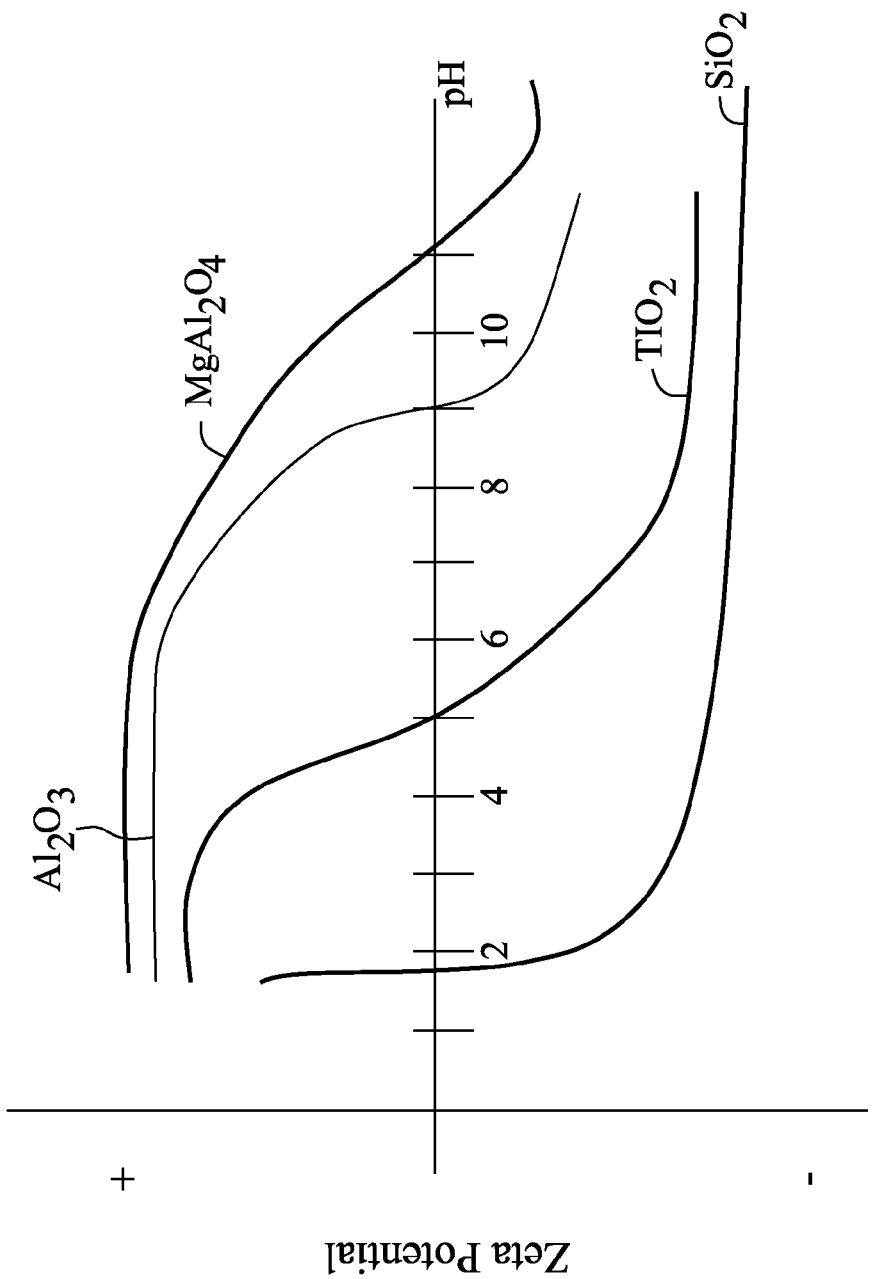
FIG. 3 is a graph showing the zeta potential of the nanoporous insulating oxide materials over a pH range.
Figure 4:
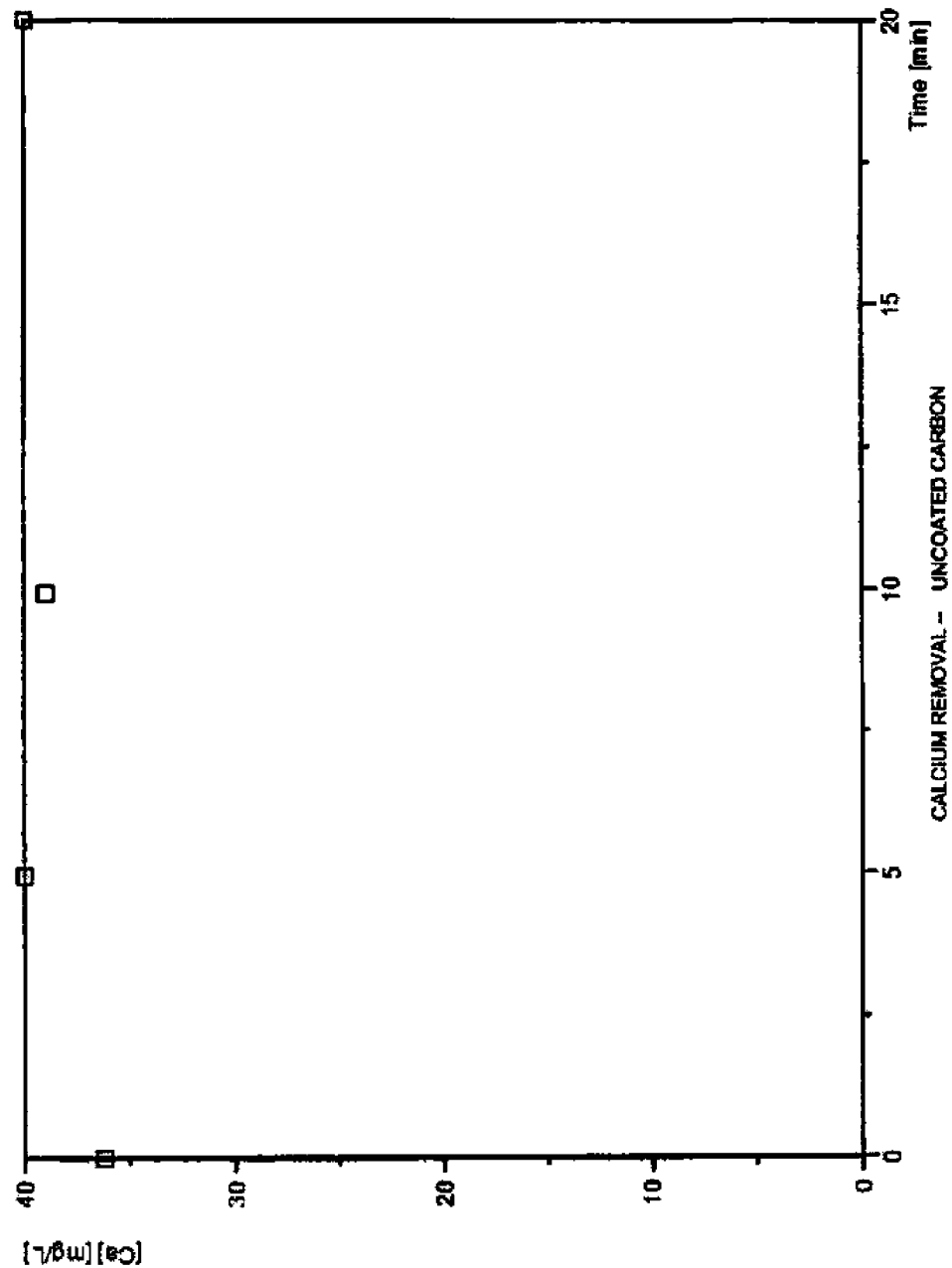
FIG. 4 is a graph showing removal of calcium ions from hard water using a conventional uncoated carbon electrodes at an applied potential of −1.5 V vs a Saturated Calomel Electrode (SCE), which is a reference electrode based on the reaction between elemental mercury and mercury (I) chloride whereby the aqueous phase in contact with the mercury and the mercury (I) chloride ($Hg_2Cl_2$, "calomel") is a saturated solution of potassium chloride in water.
Figure 5:
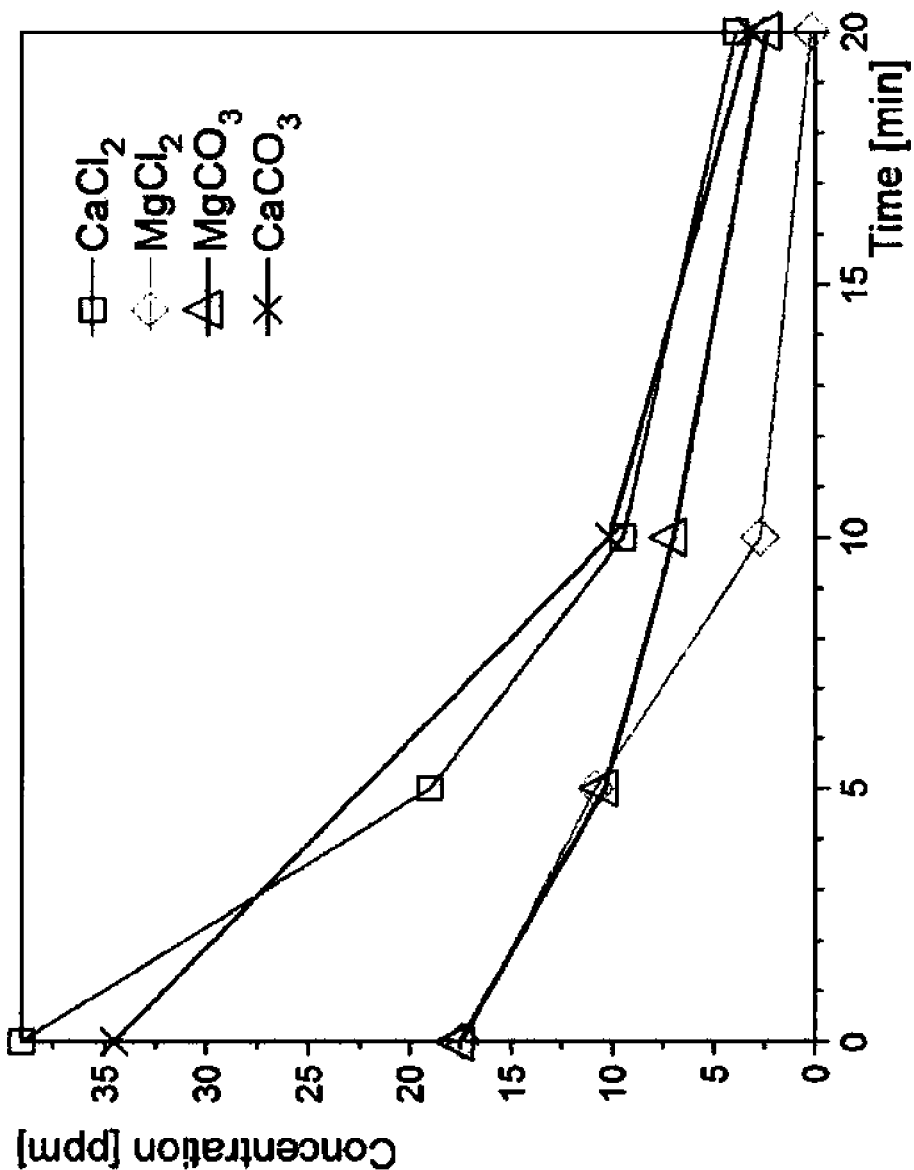
FIG. 5 is a graph showing removal of $CaCl_2$, $CaCO_3$, $MgCl_2$, and $MgCO_3$, using the instant deionization containing composite electrodes having nanoporous composite layers constructed from sols containing $MgAl_2O_4/Al_2O_3$ and $SiO_2$ nanoparticles, respectively, at an applied potential of −1.5 V versus a SCE, whereby the concentration shown was determined with respect to the cation in each system.

As shown in FIG. 3, the composite positive electrode 16 and negative electrode 14 include nanoporous insulating materials that are selected so as to provide a difference in zeta potential. For example, hard water is generally in the pH range of 6-9. At pH 6-9, $Al_2O_3$ and $MgAl_2O_4$ have a positive zeta potential, whereas $TiO_2$ and $SiO_2$ have a negative zeta potential at such ph values. That difference in zeta potential is desirable for effective and efficient removal and regeneration of cations and anions from the instant deionization device.

As shown in the comparative data of FIGS. 4-10, the instant invention removes calcium and other cations from hard water surprisingly more effectively than symmetric carbon electrodes. The invention achieved around 95% removal in 20 minutes. The instant invention can also achieve 99.9+% removal of positively- and negatively-charged bacteria and viruses by removing or deactivating such pathogens. The instant invention will also oxidize, denature and decompose organic contaminants, bacteria and viruses in various water supplies.

Figure 6:
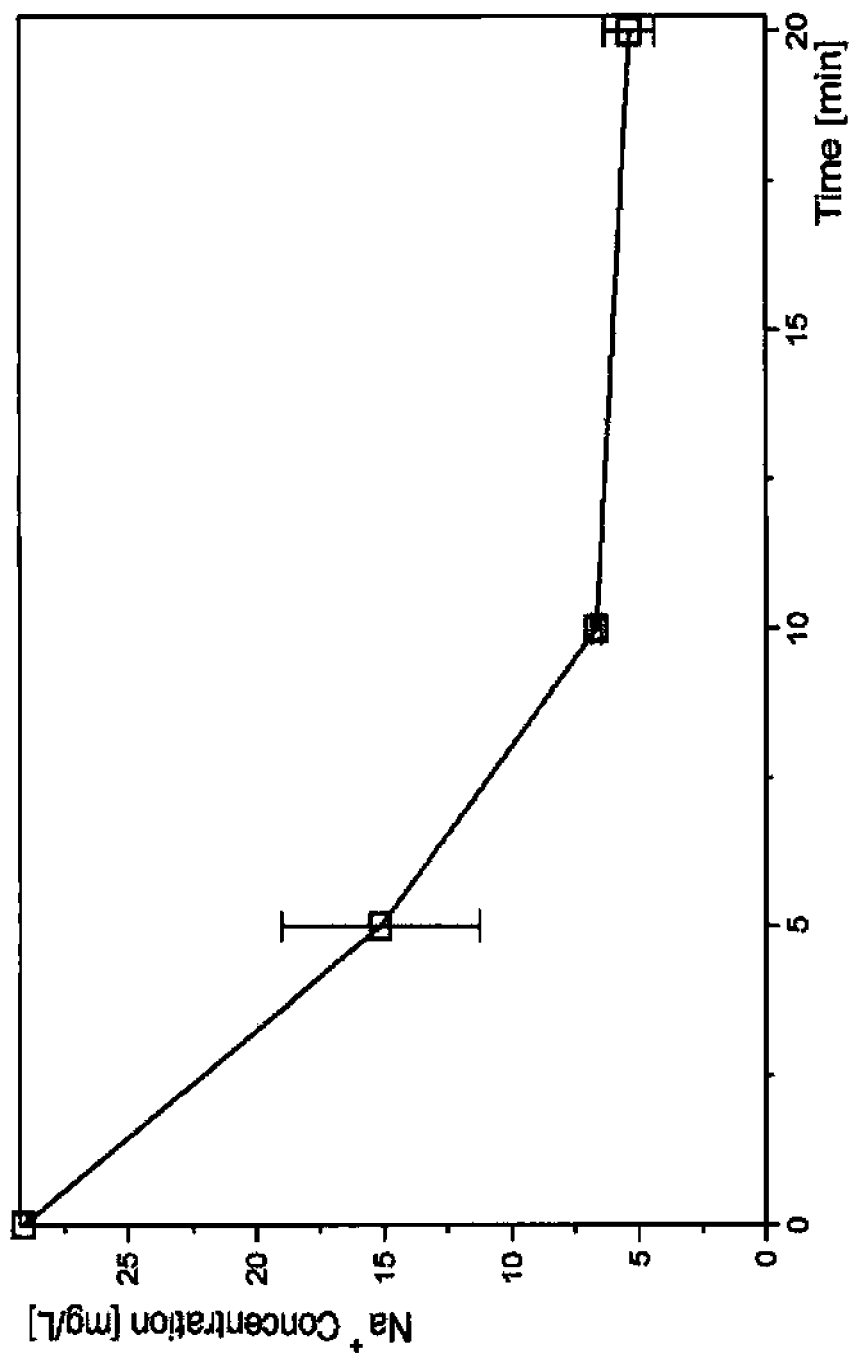
FIG. 6 is a graph showing removal of NaCl using the instant deionization device containing composite electrodes having nanoporous composite layers constructed from sols containing $MgAl_2O_4/Al_2O_3$ and $SiO_2$ nanoparticles, respectively, at an applied potential of −1.5 V versus a SCE, whereby the concentration shown was determined with respect to the cation in each system.
Figure 7:
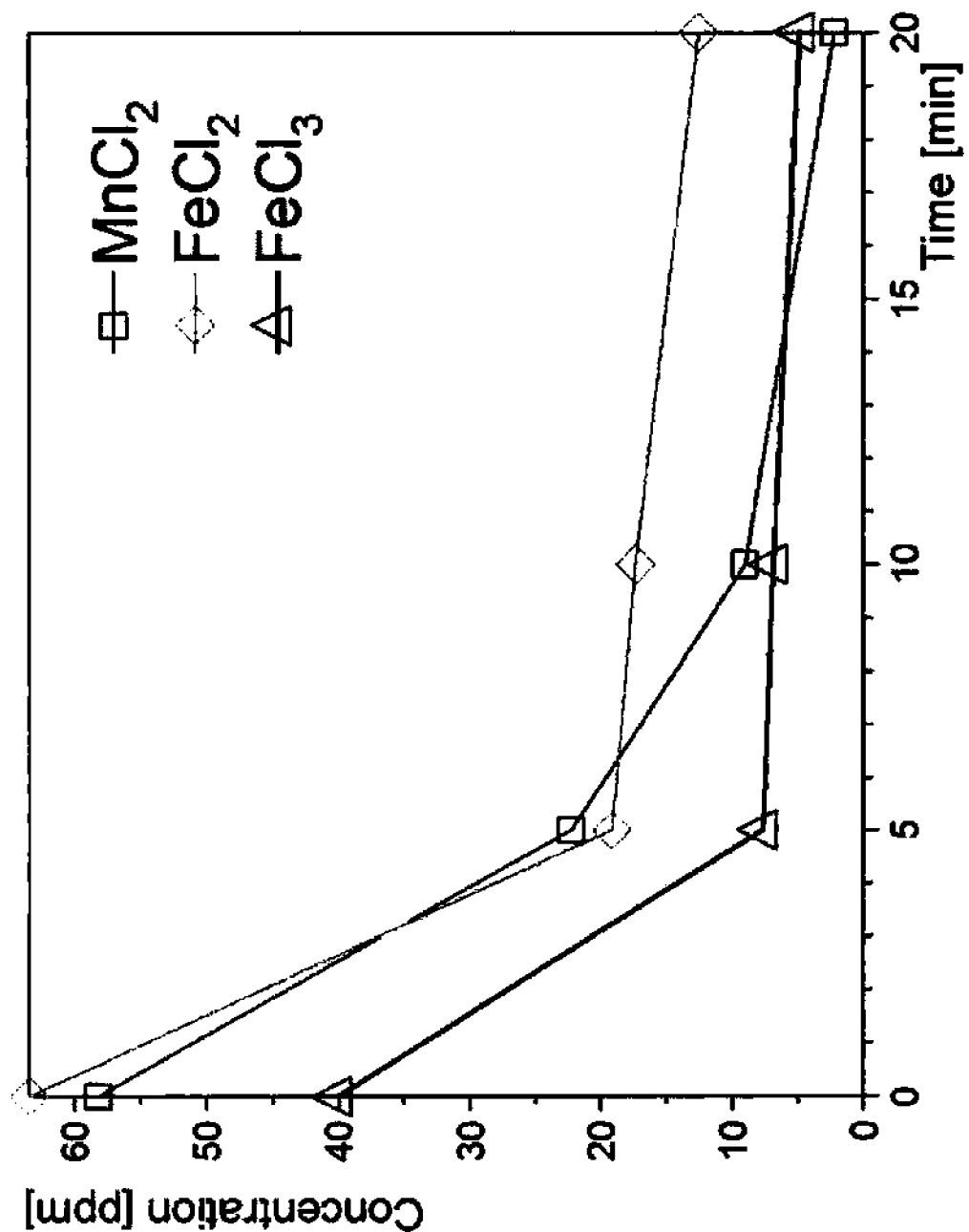
FIG. 7 is a graph showing removal of $MnCl_2$, $FeCl_2$, and $FeCl_3$ using the instant deionization device containing composite electrodes having nanoporous composite layers constructed from sols containing $MgAl_2O_4/Al_2O_3$ and $SiO_2$ nanoparticles, respectively, at an applied potential of −1.5 V versus a SCE, whereby the concentration shown was determined with respect to the cation in each system.

As shown in FIG. 6, the instant invention removes sodium ions from water very effectively—approximately 86% removal in 20 minutes.

Figure 8:
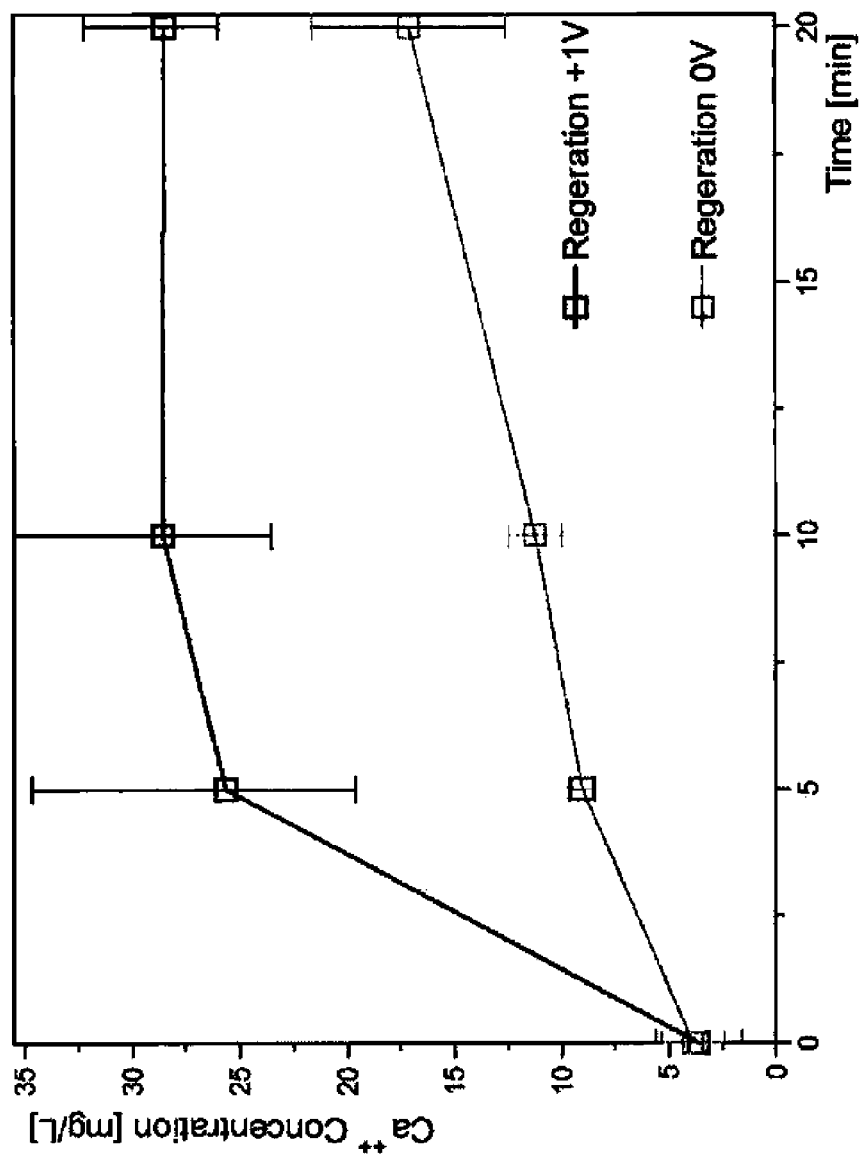
FIG. 8 is a graph showing regeneration of calcium ions from the nanoporous composite layer constructed from a sol containing $MgAl_2O_4/Al_2O_3$ at a reverse applied potential of +1.0 V vs a SCE.

As shown in FIG. 8, the instant invention regenerated approximately 100% calcium ions in 5-10 minutes.

EXAMPLES

Sol-gel chemistry techniques were used to synthesize sols containing nanoparticles of insulating oxides. The precursor to nanoporous $MgAl_2O_4$ was made using sol-gel chemistry techniques. 2.0M aluminum tri-sec-butoxide (ATSB) in 2-butanol was added to distilled/purified water at 80-85° C. in a 3.1:1 volumetric ratio of water to 2.0M ATSB. The solution was stirred for 1-2 hours. 1.6 M nitric acid was added in a 0.068:1 volumetric ratio of nitric acid to 2.0M ATSB and stirred for an additional hour. The liquid was refluxed for four hours to remove excess 2-butanol. The suspension was cooled and filtered through a series of filters, whereby the smallest was a 0.45μ membrane. The average particle diameter of the particles was approximately 20 nanometers and the isoelectric pH was approximately 9 pH units. The precursor was finalized by adding magnesium nitrate in a molar ratio of 0.2:1 Mg to Al yielding a mixture of $Al_2O_3$ and $MgAl_2O_4$ particles in a molar ratio of 0.4:1 $MgAl_2O_4$:$Al_2O_3$. The median particle diameter is in the range of 5-100 nanometers.

The filtered suspension was imbibed onto a porous conducting carbon electrode by spray coating. A porous nickel conducting electrode may also be used. The BET surface area of the uncoated carbon electrode was approximately 1 $m^2$/g. For uncoated carbon electrodes, there is a trade-off between surface area and conductivity. The surface area for the carbon backing electrode may be in the range of 1-2000 $m^2$/g, or 30-400 $m^2$/g. The preferred resistivity of the carbon backing electrode is less than 0.04 Ohm-cm.

The uncoated carbon electrode was pre-fired at 400° C. for three hours, whereby the carbon surface is rendered wettable to the sol coating. The wettable carbon surface was spray-coated with the filtered sol suspension using an ultrasonic spray coater. An air spray coater may also be used. Several coats of sol were applied to the wettable carbon electrode. The suspension-coated carbon electrode was post-fired to sinter the particles to each other as well as to the supporting carbon electrode.

Firing temperature and duration may be varied to achieve a predetermined particle diameter, pore diameter distribution and phase (particularly for $MgAl_2O_4$). Higher post-fire temperatures yield larger particle and pore diameters. In this example, the post-fire was conducted at 400° C. for 6 hours.

A second electrode was made in a manner similar to the $MgAl_2O_4$/$Al_2O_3$ coated conductive carbon electrode. The nanoporous composite layer on the second electrode was formed from a sol-gel suspension containing nanoparticles of $SiO_2$, which was prepared using sol-gel chemistry techniques.

Preparation of $SiO_2$ sol-gels are disclosed in Chu L et al., Microporous Silica Gels From Alkylsilicate-Water Two Phase Hydrolysis, *Mat. Res. Soc. Symp. Proc.* 346:855-860 (1994), which is hereby incorporated by reference.

Distilled and purified water was mixed with concentrated ammonium hydroxide ($NH_4OH$) and tetraethylorthosilicate (TEOS) in a volumetric ratio of 30:1:4.5. The pH was in the range of 8-10. The solution/suspension was mixed for at least 1 hour, whereby hydrolysis reaction occurred foxing suspended nanoparticles of $SiO_2$. The $SiO_2$ particles had a median primary particle diameter of approximately 2-5 nanometers. The isoelectric pH was approximately 2 pH units. The sol may be dialyzed to remove excess ions from solution, whereby the sol is transfer through dialysis membranes.

The filtered suspension was imbibed onto a porous conducting carbon electrode using an ultrasonic spray coater. A porous nickel conducting electrode may also be used. The BET surface area of the uncoated carbon electrode was approximately 1 m$^2$/g. For uncoated carbon electrodes, there is a tradeoff between surface area and conductivity.

The uncoated carbon electrode was pre-fired at 400° C. for three hours, whereby the carbon surface is rendered wettable to the sol coating. The wettable carbon surface was spray-coated with the filtered sol suspension using an ultrasonic spray coater. An air spray coater may also be used. Several coats of sol were applied to the wettable carbon electrode. The suspension-coated carbon electrode was post-fired to cure the sol coating.

Firing temperature and duration may be varied to achieve a predetermined particle diameter, pore diameter distribution and phase. In this example, the post-fire for $SiO_2$ was conducted at 400° C. for 3 hours.

The deionization device included tee electrodes: the $SiO_2$-coated composite electrode, the $MgAl_2O_4/Al_2O_3$-coated composite electrode and a reference electrode. (See FIG. 1). The isoelectric pH of the cation removal nanoporous composite layer is preferably more than 0.5 pH unit lower than the pH of the water being treated. The isoelectric pH of the anion removal nanoporous composite layer is preferably more than 0.5 pH unit higher than the pH of the water being treated. The deionization device also included a porous nonconductive separator material to prevent electrical shorting. An exemplary separator is one made from nylon mesh 250 μm purchased from Small Parts, Inc., item #: CMN-0250-D).

During operation of the ion removal cycle, a negative potential was applied to the $SiO_2$-coated composite electrode with respect to the reference electrode, which can withdraw cations. Anions were correspondingly removed at the $MgAl_2O_4/Al_2O_3$-coated composite electrode, which had a positive potential. The $SiO_2$ layer has a negative zeta potential at the pH of household water. The $MgAl_2O_4/Al_2O_3$ layer has a positive zeta potential at the pH of household water. (See FIG. 3). Since the $SiO_2$ layer has a negative zeta potential at the pH of household water, and the $MgAl_2O_4/Al_2O_3$ layer has a positive potential. Thus, the cations are removed against the $SiO_2$ layer which is negative at the pH of household water, and the anions are removed to the $MgAl_2O_4/Al_2O_3$ layer.

To regenerate the electrodes or flush the cations and anions from the electrodes, a regeneration cycle of operations is conducted. To do so, the voltage polarity of the $SiO_2$ electrode is changed with respect to the reference electrode, which provides for accurate voltage control over the working electrode and optimal removal efficiency. Upon the change in polarity, the cations being held against the $SiO_2$ layer begin to migrate toward the $MgAl_2O_4/Al_2O_3$ layer, and the anions being held against the $MgAl_2O_4/Al_2O_3$ electrode begin migrating toward the $SiO_2$ electrode. As such, neither the cations nor the anions will stick to the electrodes so long as the repulsion force due to the zeta potential of the respective electrodes exceeds the force of the applied potential moving the ions. Potentials useful for removing the cations/anions in the regeneration cycle are as follows for $CaCl_2$: −1.5V vs SCE and +1.0V vs. SCE, respectively. Other potentials are also useful depending on the chemistry of the cations and anions.

The instant nanoporous insulating composite electrodes provide an unexpectedly superior deionization device, which is preferably used to soften household hard water, treat other sources of water and/or desalinate water. In particular, the use of asymmetric electrode of differing zeta potential is also a pioneering concept in the field of deionization equipment. Regeneration is accomplished by reversing polarity of the electrodes, which is impossible using symmetric electrodes. Regeneration is also performed without discharging brine, which is necessary in conventional home water softeners using ion exchange resins. Brine discharge has become an environmental concern. The instant invention also eliminates the need for salt, which is necessary for operation of conventional ion exchange water softeners.

Figure 9:
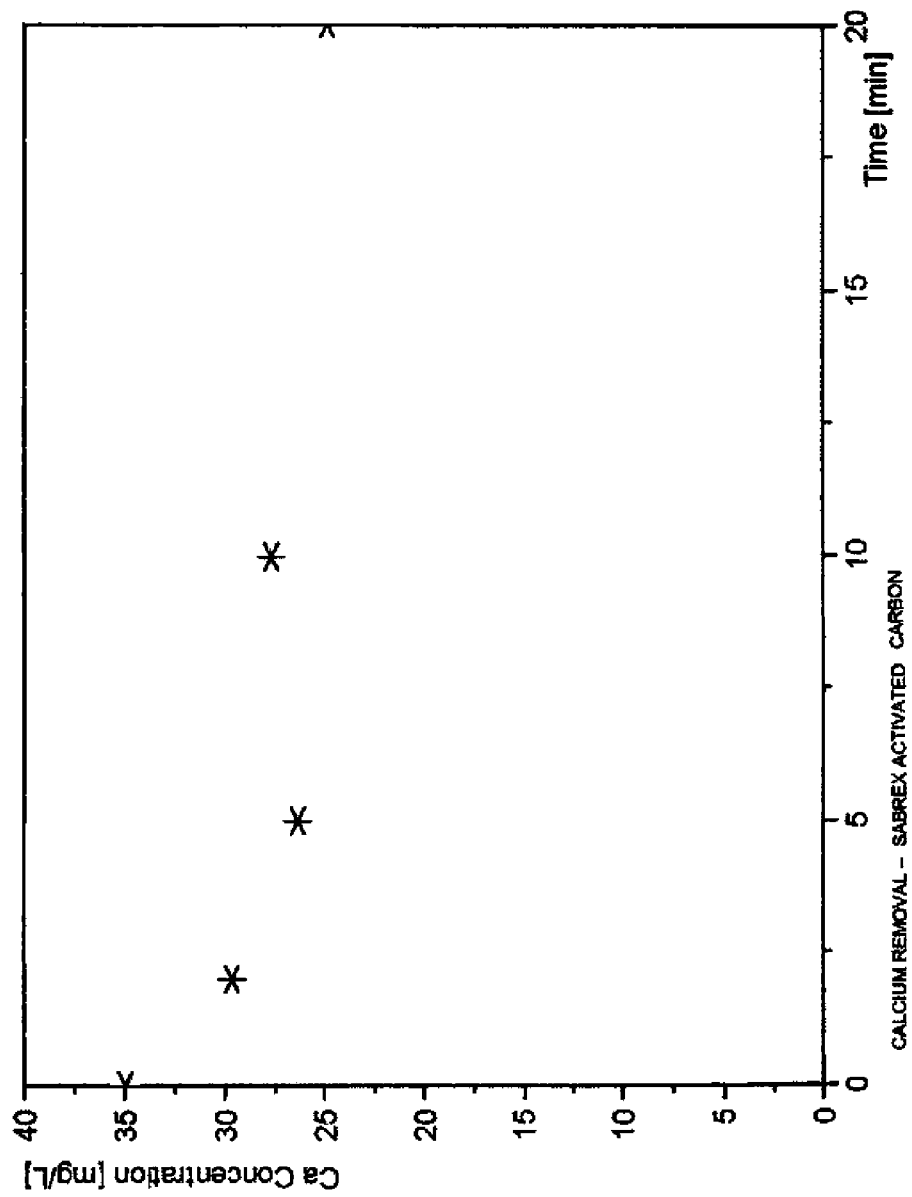
FIG. 9 is a graph of removal of $CaCl_2$ using materials from a Sabrex device having carbon and ion exchange membranes.
Figure 10:
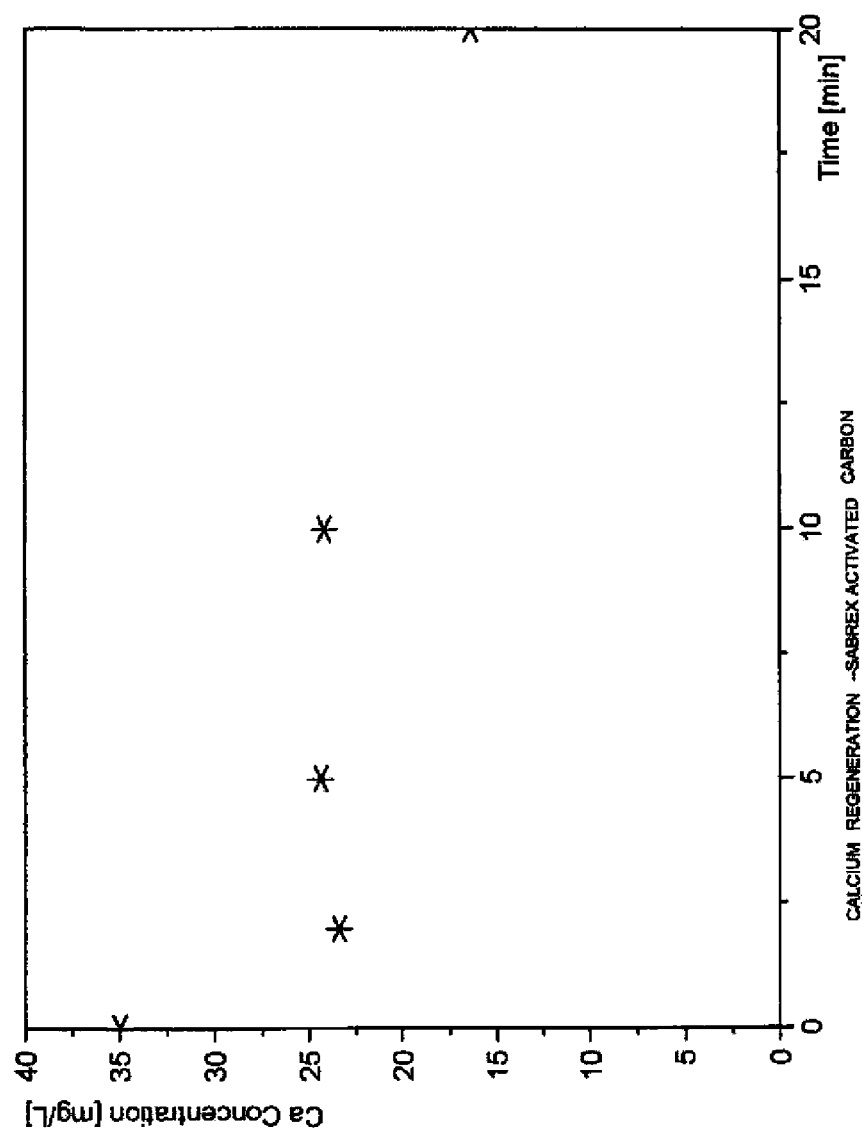
FIG. 10 is a graph showing regeneration of calcium ions using a Sabrex device having carbon and ion exchange membranes.

As a comparison to the instant invention, the data shown in FIGS. 8 and 9 demonstrate that the instant nanoporous insulating composite electrodes remove cations and anions from hard water superior to that achieved by activated carbon electrodes. The data shown in FIGS. 8 and 9 was generated using carbon with ion exchange membranes found in the Sabrex EWP Electronic Water Purification Technology available from Sabrex of Texas, Inc., San Antonio, Tex. A removal cycle was performed on water containing dissolved $CaCl_2$. Theoretically, assuming complete regeneration, the concentration of calcium ions after the regenerations cycle should have been 60 ppm (i.e., 40 ppm of initial concentration plus 20 ppm regenerated from the removal cycle.) Thus, the data demonstrate that no significant regeneration of calcium ions occurred during the regeneration cycle using the activated carbon electrodes.

In another example, Distilled and purified water was mixed with concentrated nitric acid ($HNO_3$) and 75% Aluminum Tri-Sec Butoxide (ATSB) in 2-Butanol in a volumetric ratio of 47.1:1:8.8. The solution/suspension was mixed for at least 1 hour, whereby the hydrolysis reaction results in suspended nanoparticles of $Al_2O_3$.

We claim:

1. A water treatment device comprising:
    a first composite electrode comprising:
        a first conductive member; and
        a first composite member comprising a first oxide selected from the group consisting of a first insulating oxide and a first non-insulating oxide, the first composite member having pores with a median pore diameter in the range of 0.1-500 nanometers;
    a second composite electrode comprising:
        a second conductive member; and
        a second composite member comprising a second oxide selected from the group consisting of a second insulating oxide and a second non-insulating oxide, the second composite member having pores with a median pore diameter in the range of 0.1-500 nanometers;
    a porous non-conductive separator material disposed between the first composite electrode and the second composite electrode, the separator material configured so that electrolytes of an electrolyte-containing solution can migrate from the first composite electrode through the separator material to the second composite electrode; and
    an electrical potential member; wherein the first oxide is different from the second oxide; wherein the first oxide has a zeta potential less than zero at the pH of a water sample, and the second oxide has a zeta potential greater than zero at the pH of the water sample; and
    wherein the first composite member in the water sample has a first isoelectric pH less than the pH of the water sample and the second composite member in the water sample has a second isoelectric pH greater than the pH of the water sample.

2. The device of claim 1, wherein the first composite member is at least 95% free of mixed oxidation states of the first oxide and/or the second composite member is at least 95% free of mixed oxidation states of the second oxide.

3. The device of claim 1, wherein the first composite member contains no more than a trace amount of mixed oxidation states of the first oxide and the second composite member contains no more than a trace amount of mixed oxidation states of the second oxide.

4. The device of claim 1, wherein the first composite member is substantially free of mixed oxidation states of the first oxide, and wherein the second composite member is substantially free of mixed oxidation states of the second oxide.

5. The device of claim 1, wherein the median pore diameter of the first composite member and the median pore diameter of the second composite member are in the range of 0.3-25 nanometers.

6. The device of claim 1, wherein the median pore diameter of the first composite member and the median pore diameter of the second composite member are in the range of 0.3-10 nanometers.

7. The device of claim 1, wherein the first composite member and the second composite member each have an average surface area in the range of 300-600 $m^2/g$.

8. The device of claim 1, wherein the first conductive member and/or the second conductive member is porous.

9. The device of claim 1, wherein the first conductive member and/or the second conductive member is nonporous.

10. The device of claim 1, wherein the first conductive member and/or the second conductive member is constructed from a material selected from the group consisting of conductive polymer, metal, conductive carbon, and combinations thereof.

11. The device of claim 1, further comprising a reference electrode constructed from a metal selected from the group consisting of Ag, Hg, Cu, Pd, Au, Pt and combinations thereof.

12. The device of claim 1, wherein the first non-insulating oxide and the second non-insulating oxide are a member selected from the group consisting of $MnO_2$, $V_2O_5$, iron oxides, $RuO_2$, NiO, CoO and a transition metal oxide.

13. The device of claim 1, wherein the first composite member is a layer and the second composite member is a layer, each layer having an average thickness in the range of 0.01 to 50 μm, and wherein the second oxide is an alkaline substituted aluminum oxide or an alkaline earth substituted aluminum oxide.

14. The device of claim 1, wherein the first composite member is a layer, and the second composite member is a layer, each layer having an average thickness in the range of 0.1 to 10 μm, and wherein the second oxide is an alkaline substituted aluminum oxide or an alkaline earth substituted aluminum oxide.

15. The device of claim 1, wherein the first composite member is constructed from a first stable sol-gel suspension comprising first insulating oxide particles of the first insulating oxide, and the second composite member is constructed from a second stable sol-gel suspension comprising second insulating oxide particles of the second insulating oxide, the first insulating oxide particles and the second insulating oxide particles each having a median primary particle diameter in the range of 1-50 nanometers, and wherein the first insulating oxide has a first negative zeta potential in the water sample at the pH range of 6-9 and the second insulating oxide has a second positive zeta potential in the water sample at the pH range of 6-9, and wherein the difference between the first negative zeta potential and the second positive zeta potential is sufficient to remove alkaline cations, alkaline earth cations, organic cations, and/or organic anions from the water sample at the pH range of 6-9.

16. The device of claim 1, wherein the first composite member is constructed from first insulating oxide particles of the first insulating oxide that is selected from the group consisting of $SiO_2$, $TiO_2$ and mixtures thereof, and wherein the second composite member is constructed from second insulating oxide particles of the second insulating oxide that is selected from the group consisting of an $Al_2O_3$, $MgAl_2O_4$, Mg-doped $Al_2O_3$, Ca-doped $Al_2O_3$, Na-doped $Al_2O_3$, K-doped $Al_2O_3$, Li-doped $Al_2O_3$, Be-doped $Al_2O_3$, Mg-substituted $Al_2O_3$, Ca-substituted $Al_2O_3$, Na-substituted $Al_2O_3$, K-substituted $Al_2O_3$, Li-substituted $Al_2O_3$, Be-substituted $Al_2O_3$, Mg-adsorbed $Al_2O_3$, Ca-adsorbed $Al_2O_3$, Na-adsorbed $A_2O_3$, K-adsorbed $A_2O_3$, Li-adsorbed $Al_2O_3$, Be-adsorbed $Al_2O_3$, and mixtures thereof.

17. The device of claim 16, wherein the first insulating oxide particles are $SiO_2$ particles having a median primary particle diameter in the range of 1-50 nanometers.

18. The device of claim 16, wherein the first insulating oxide particles are $TiO_2$ particles having a median primary particle diameter in the range of 1-50 nanometers.

19. The device of claim 16, wherein the first insulating oxide particles are $TiO_2$ particles having a median primary particle diameter in the range of 0.3-5 nanometers.

20. The device of claim 16, wherein the first insulating oxide particles are $SiO_2$ particles having a median primary particle diameter in the range of 1-8 nanometers.

21. The device of claim 16, wherein the second insulating oxide particles are $Al_2O_3$ particies having a median primary particle diameter in the range of 1-50 nanometers.

22. The device of claim 16, wherein the second insulating oxide particles are $Al_2O_3$ particles having a median primary particle diameter in the range of 1-20 nanometers.

23. The device of claim 16, wherein the second insulating oxide particles are $MgAl_2O_4$ particles having a median primary particle diameter in the range of 1-50 nanometers.

24. The device of claim 16, wherein the second insulating oxide particles are $MgAl_2O_4$ particles having a median primary particle diameter in the range of 1-20 nanometers.

25. The device of claim 16, wherein the first insulating oxide particles are $SiOhd 2$ particles, wherein the second insulating oxide particles are a mixture of $Al_2O_3$ particles and $MgAl_2O_4$ particles at a molar ratio in the range of $(0.01-1):1$, $Al_2O_3:MgAl_2O_4$, wherein the $SiO_2$ particles have a median primary particle diameter in the range of 1-50 nanometers, wherein the $Al_2O_3$ particles have a median primary particle diameter in the range of 1-50 nanometers, and wherein the $MgAl_2O_4$ particles have a median primary particle diameter in the range of 1-50 nanometers.

26. The device of claim 25, wherein the molar ratio of $Al_2O_3:MgAl_2O_4$ is in the range of $(0.4-1):1$, wherein the $SiO_2$ particles have a median primary particle diameter in the range of 1-8 nanometers, wherein the $Al_2O_3$ particles have a median primary particle diameter in the range of 1-20 nanometers, and, wherein the $MgAl_2 O_4$ particles have a median primary particle diameter in the range of 1-20 nanometers.

27. A method of using any one of the devices of claims 1-3 to treat a water supply comprising:
 providing any one of the devices of claims 1-3
 providing the water supply, the water supply including one or more cations and one or more anions;
 generating electrical removing potential and electrical removing current between the first composite electrode and the second composite electrode; and
 passing the water supply between the first composite electrode and second composite electrode.

28. The method of claim 27, wherein the water supply contains positively-charged members selected from the group consisting of positively-charged bacteria, positively-charged protein virus, $Na^+$, $Ca^{2+}$, $Mg^{2+}$, $K^+$, $Sr^{2+}$, $Ba^{2+}$, $Fe^{2+}$, $Fe^{3+}$, $Mn^{2+}$, $Mn^{3+}$, $Me^{4+}$, $Mn^{7+}$, $Cu^+$, $Cu^{2+}$, $Cu^{3+}$, $Pb^{2+}$, $Pb^{4+}$, $PbCl^+$, $Al^{3+}$, $Be^{2+}$, $Cs^+$, $Cr^{2+}$, $Cr^{3+}$, $Cr^{6+}$, $Co^{2+}$, $Co^{3+}$, $Ga^{3+}$, and $Zn^{2+}$, $Li^+$, $Hg^{2+}$, $Ni^{2+}$, $Ni^{3+}$, $Ag^+$, $Sr^{2+}$, $Sn^{2+}$, $Sn^{4+}$, $NH_2^+$, $H_3O^+$, $NO_2^+$, $Hg^{2+}$ or combinations thereof and, wherein the water supply contains negatively-charged members selected from the group consisting of negatively-charged bacteria, negatively-charged amino acid virus, $Cl^-$, $NO_3^-$, $NO_2^-$, $SO_4^{2-}$, $HSO_3^-$, $S_2O_3^{2-}$, $HSO_4^-$, $HCO_2^-$, $HCO_3^-$, $CO_3^{2-}$, $F^-$, $As^{3-}$, $AsO_3^{3-}$, $AsO_4^{3-}$, $PO_3^{3-}$, $PO_4^{3-}$, $HPO_4^{2-}$, $H_2PO_4^-$, $H_2BO_3^-$, $HBO_3^{2-}$, $BO_3^{3-}$, $B_4O_7^{2-}$, $HB_4O_7^{2-}$, $ClO_3^-$, $ClO_4^-$, $ClO_2^-$, $ClO^-$, $Pb(OH)_4^{2-}$, $Pb(OH)_6^{2-}$, $PbCl_3^-$, $PbCl_4^{2-}$, $N_3^-$, $Br^-$, $H^-$, $I^-$, $N^{3-}$, $NH_2^-$, $O^{2-}$, $P^{3-}$, $S^{2-}$, $HS^-$, $O_2^{2-}$, $BrO_3^-$, $BrO^-$, $OH^-$, $CrO_4^{2-}$, $Cr_2O_7^{2-}$, $IO_3^-$, $MnO_4^-$, $C_2H_3O_2^-$, $C_2O_4^-$, $HC_2O_4^-$, $Te^{2-}$, $OCN^-$, $SCN^-$, $CN^-$ or combinations thereof.

29. The method of claim 28, wherein the positively-charged and negatively-charged bacteria is selected from the group consisting of *Bacillus, Listeria, Staphylococcus, Streptococcus, Enterococcus, Clostridium, Mycoplasma, actinobacteria, Firmicutes*, and *Deinococcus-Thermus, Escherichia coli, Salmonella, Enterobacteriaceae, Pseudomonas, Moraxella, Helicobacter, Stenotrophomonas, Bdellovibrio,* acetic acid bacteria, *Legionella*, alpha-proteobacteria, *Wolbachia,* cyanobacteria, spirochaetes, green sulfur bacteria, green non-sulfur bacteria, Crenarchaeota, *Neisseria gonorrhoeae, Neisseria meningitidis, Moraxella catarrhalis, Hemophilus influenzae, Klebsiella pneumoniae, Legionella pneumophila, Pseudomonas aeruginosa, Escherichia coli, Proteus mirabilis, Enterobacter cloacae, Serratia marcescens, Helicobacter pylori, Salmonella enteritidis, Salmonella typhi*, and *Acinetobacter baumanii*.

30. The method of claim 27, wherein the electrical removing potential is constant and in the range of −10 to 10 V/cm³.

31. The method of claim 27, wherein the electrical removing potential is constant and in the range of −2 to 2 V/cm³.

32. The method of claim 27, wherein the electrical removing current is constant and in the range of −5 to 5 A/cm³.

33. The method of claim 27, wherein the electrical removing current is constant and in the range of −1 to 1 A/cm³.

34. The method of claim 27, wherein the electrical removing current is constant and in the range of −100 to 100 mA.

35. A method of regenerating any one of the devices of claims 1-3 comprising:
   providing any one of the devices of claims 1-3;
   reversing the polarity of an electrical potential between the first composite electrode and the second composite electrode; and
   providing electrical regeneration potential between the first composite electrode and the second composite electrode.

36. A method of desalinating water comprising:
   providing any one of the devices of claims 1-3,
   providing a salt water supply;
   generating electrical removing potential and electrical removing current between the first composite electrode and the second composite electrode; and
   passing the salt water supply between the first composite electrode and the second composite electrode.

37. A method of treating a bacteria-containing and/or virus-containing water supply comprising:
   providing any one of the devices of claims 1-3;
   providing the bacteria-containing and/or virus-containing water supply;
   generating electrical removing potential and electrical removing current between the first composite electrode and the second composite electrode; and
   passing the bacteria containing and/or virus-containing water supply between the first composite electrode and the second composite electrode.

* * * * *